J. Davidson.
Reefing Sails.

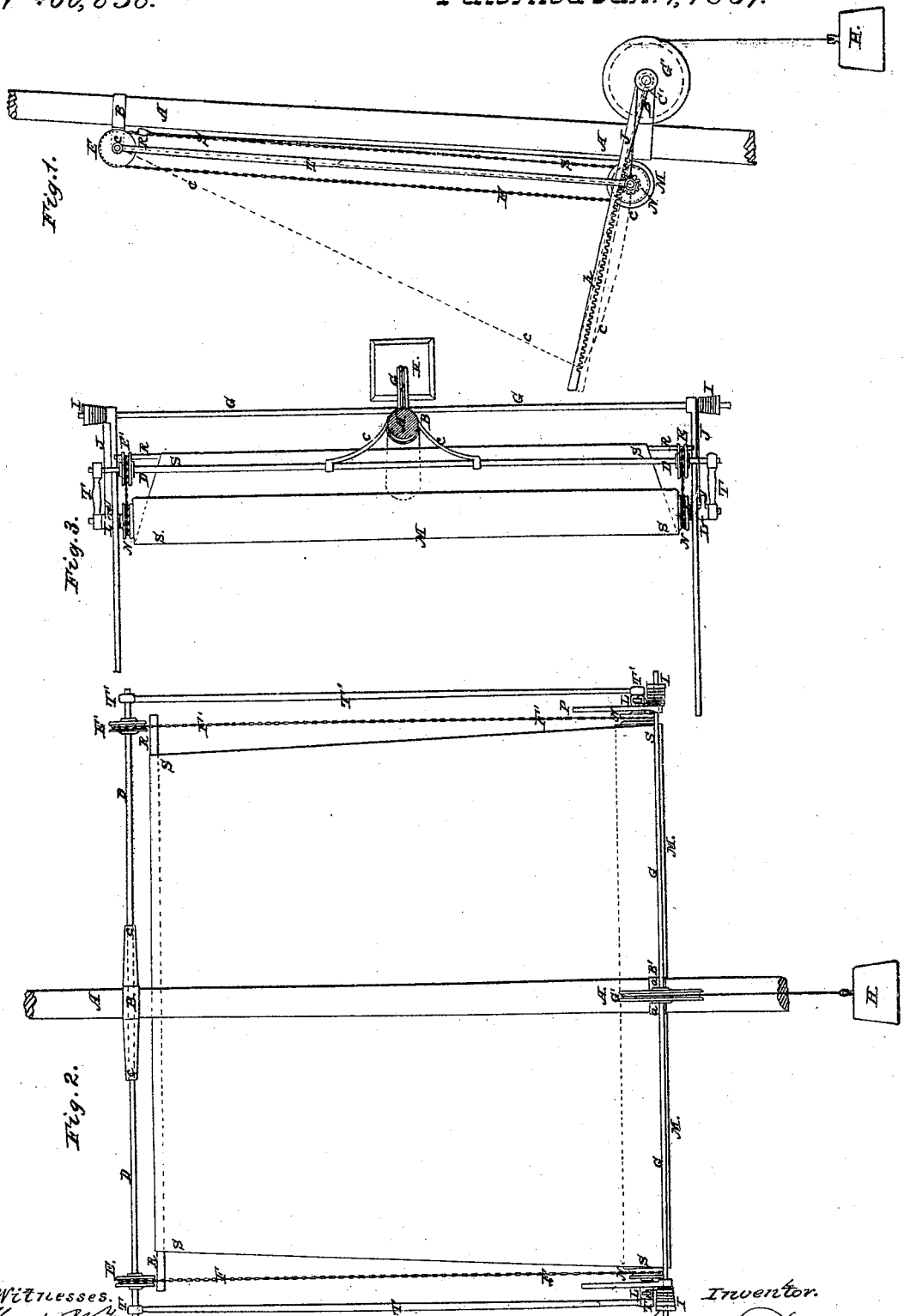

N°60,838.                    Patented Jan. 1, 1867.

Witnesses.                    Inventor:

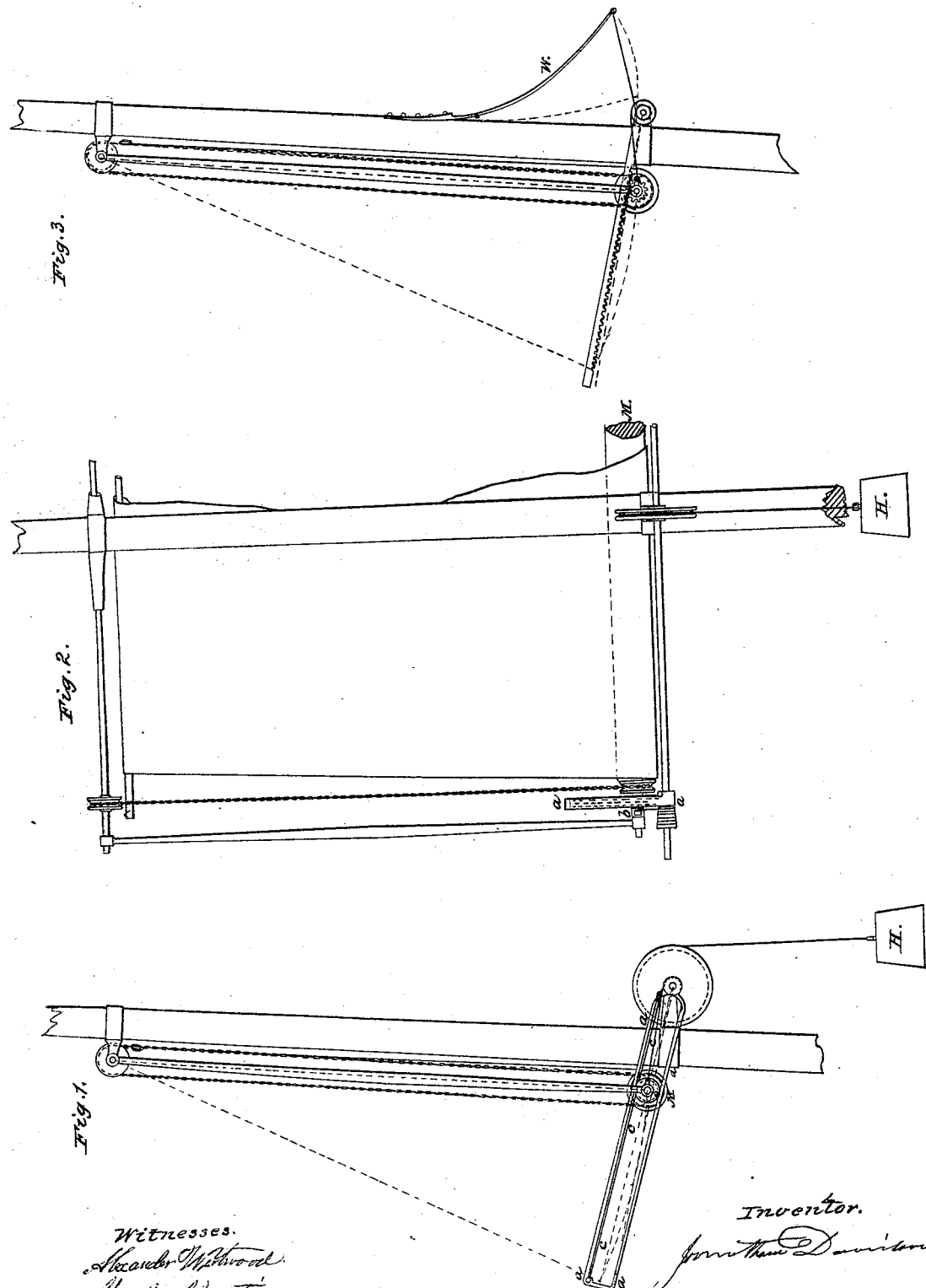

Sheet 4. 7 Sheets
J. Davidson.
Reefing Sails.
N°. 60,838. Patented Jan. 1, 1867.
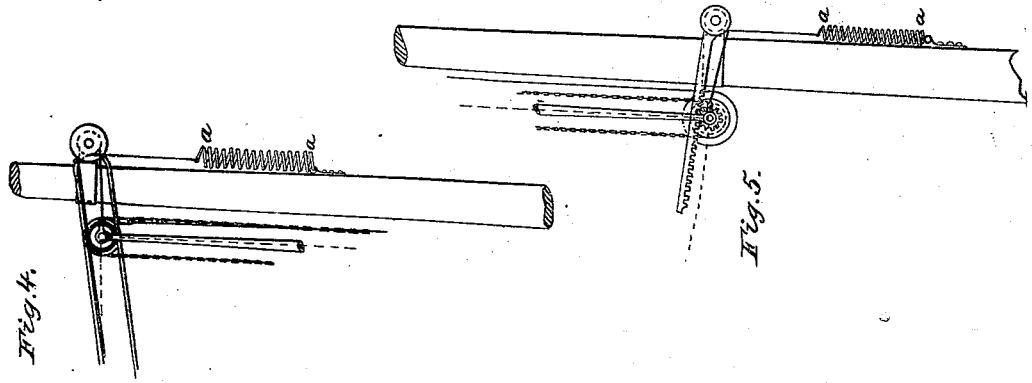
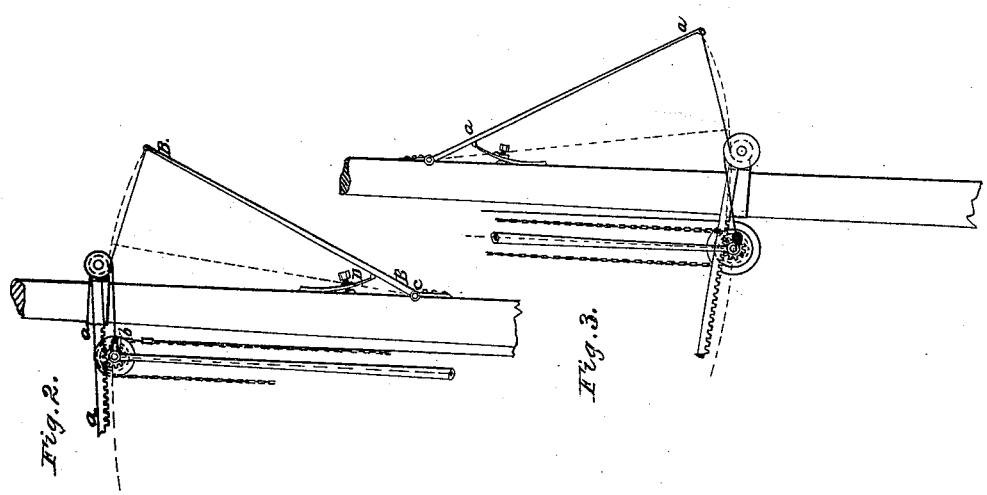
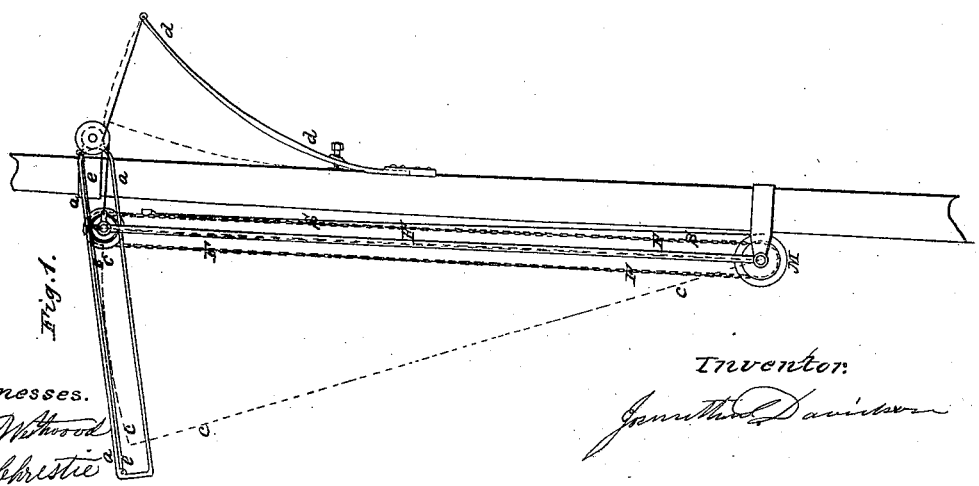
Witnesses.
Alexander Withrow
Charles Christie
Inventor:
James Davidson J. Davidson.
Reefing Sails.
No. 60,838. Patented Jan. 1, 1867.
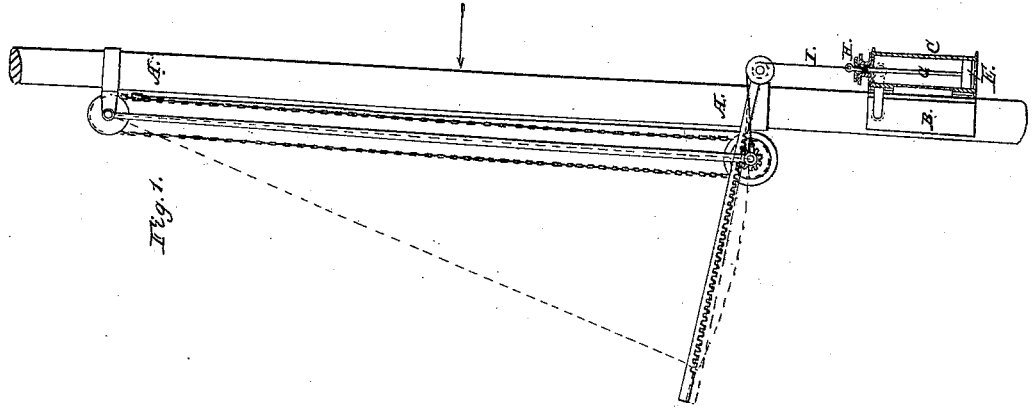
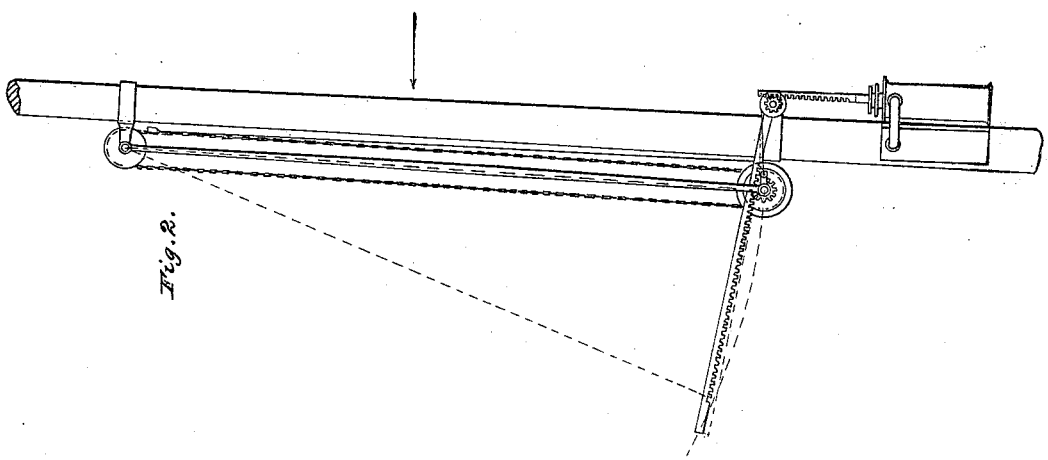
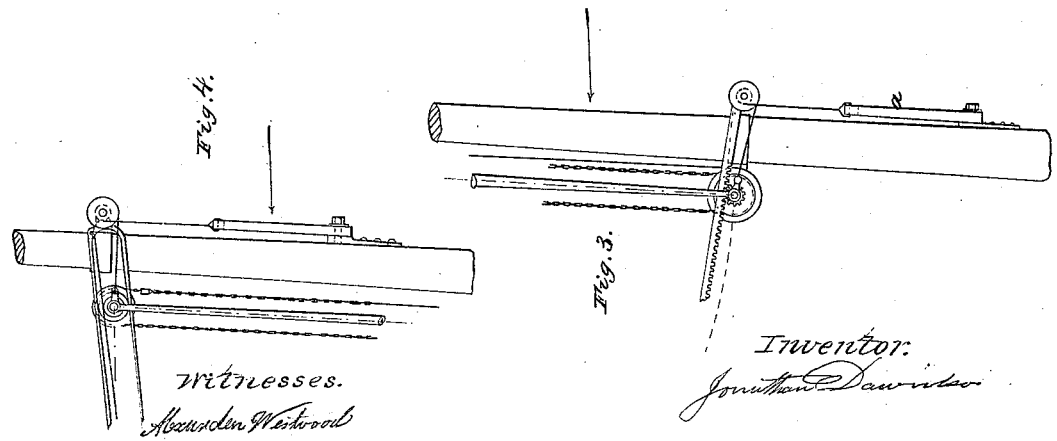
Witnesses.
Alexander Westwood
Charles Christie
Inventor:
Jonathan Davidson Sheet 6. 7 Sheets.
J. Davidson.
Reefing Sails.
Nº 60,838. Patented Jan. 1, 1867.
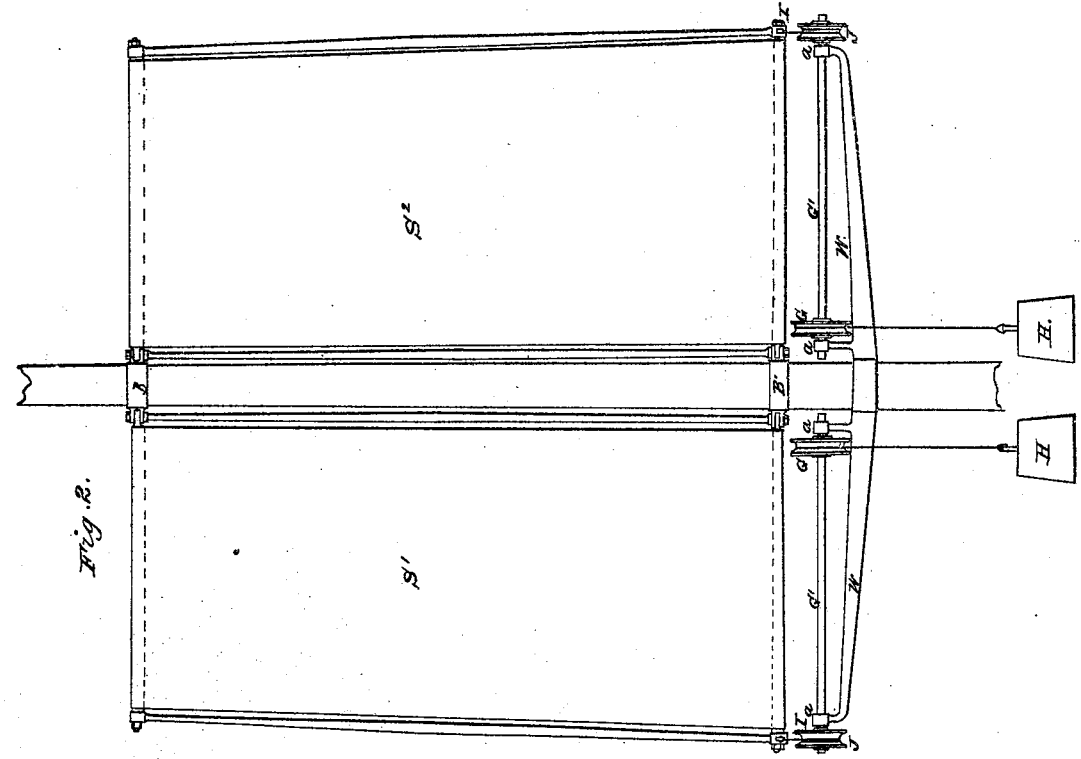
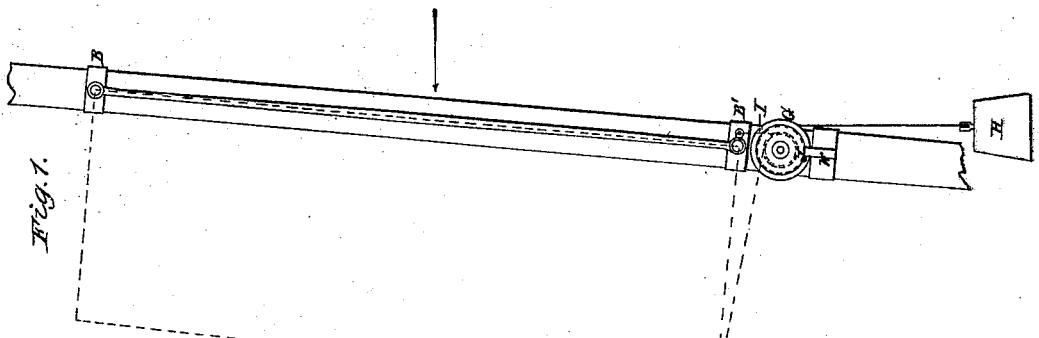
Witnesses.
Alexander Watsood
Charles Christie
Inventor
Jonathan Davidson Sheet 7. 7 Sheets.

J. Davidson
Reefing Sails.

Nº 60,838.          Patented Jan. 1, 1867.

Witnesses.
Alexander Westwood
Charles Christie

Inventor.
Jonathan Davidson

United States Patent Office.

JONATHAN DAVIDSON, OF EDINBURGH, NORTH BRITAIN.

Letters Patent No. 60,838, dated January 1, 1867.

IMPROVED APPARATUS FOR REEFING SAILS.

The Schedule referred to in these Letters Patent and making part of the same.

TO WHOM IT MAY CONCERN:

Be it known that I, JONATHAN DAVIDSON, of Edinburgh, in the county of Midlothian, North Britain, have invented certain new and useful Improvements in the Reefing of Sails, and in the machinery or apparatus connected therewith; and I do hereby declare the following to be a full, clear, and exact description thereof, reference being had to the accompanying drawings.

This invention has for its essential object the rendering of the sails of ships capable of being automatically reefed by the pressure of the wind at any time, so that the power or force tending to propel the ship may never be exceeded by any increase in the pressure of the wind—that is to say, when a wind of a certain definite pressure is acting upon a certain area of sails, the vessel is propelled at a certain rate. In order that the vessel may be propelled at the same rate under a higher wind pressure, the area of sails exposed to the action of the wind is, by means of this invention, contracted relatively with the pressure.

The apparatus by which this invention is carried into effect consists as follows: The yards to which the sail is fixed are made capable of revolving, and a coiled spring or springs, or other suitable means for producing rotation of the yards, is or are applied to them to counteract the pressure of the wind. A fusee-wheel or wheels is or are applied to each of the yards, and a rope or chain wound round them, and the barrel or barrels containing the spring or springs in a manner similar to the chain on the fusee-wheel and spring barrel of a watch. When the wind increases in pressure, it acts in consequence more forcibly on the sails, and in tending to draw them out of their flat form, one of the yards is caused to revolve by the tension thus produced on the chains or ropes, which action being communicated to the other yards, by means of the fusees and chains or ropes at their ends or central parts, causes the other yard also to rotate and wind up a portion of the sail, the tension of the coiled spring being counteracted by the pressure of the wind against the sails, so that when the pressure of the wind again diminishes, the spring unwinds the yard, and an increased area of sail is presented for the wind to act against.

In using the term "self-reefing sails," it is not employed to signify a meaning precisely corresponding to that for which the expression has hitherto been used. The interpretation here given to the expression, when used to designate this present invention or any of its modifications, is the diminishing or enlarging of the area of the sail exposed to the pressure of the wind in an inverse ratio to the increase or decrease of the wind pressure itself; that is, as the pressure of the wind increases, the area of the sail exposed to its force is inversely diminished, and, on the contrary, as the wind pressure diminishes, the exposed area of the sail is inversely increased. By means of the apparatus for effecting the increased or decreased area of the sail, a force constantly of the same effect is obtained for propelling the ship, and thereby several advantages are derived—amongst others, in the event of a storm coming on suddenly at sea, and when, with sails as ordinarily constructed, the operation of furling or reefing would be dangerous or impossible, the present invention causes the sails to be spontaneously reefed by the very pressure of the wind itself, so that the stress of a storm upon a ship fitted with sails and self-reefing apparatus, constructed according to this invention, would be diminished in a very large ratio. Another advantage is that the commander of a ship, knowing the nature of his cargo and the rate at which he can safely travel with it, can, before leaving port, or at any other time, adjust the sails and self-reefing apparatus so as to enable him to sail at any given rate, which rate becomes the balancing point between the pressure of the wind and the tension on the balancing apparatus. Other advantages are that the risk of breaking masts and rigging and the overturning of a vessel are much lessened, and in consequence of the various modifications of which the invention is susceptible, it can be applied with equal facility to the smallest skiff or the largest vessel afloat. There are several other advantages to be derived from the use of this invention, but which I do not consider it necessary herein to specify, as they will be at once evident to every practical seaman.

*Description of Drawings.*

On sheet 1—

Figure 3:
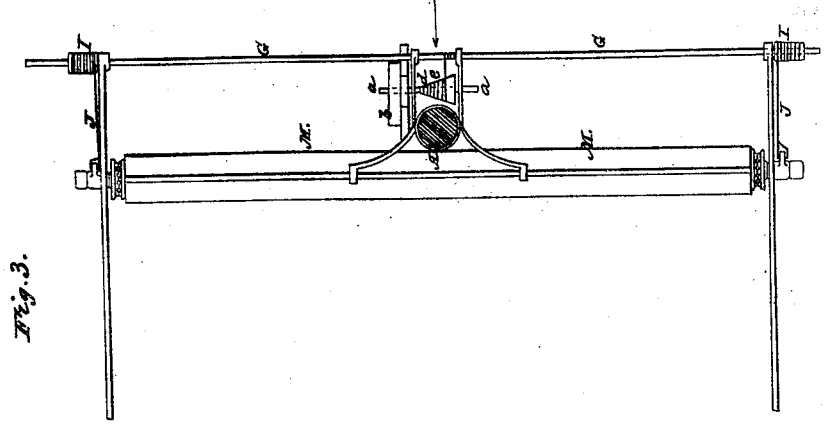
Figure 3 is a plan of the same.

On referring to the figure, it will be seen that the mast A is fitted with rings B and B', from which the brackets C and C' project, the upper one, C, carrying the shaft D, the ends of which are fitted with guide pulleys or rollers E and E', the groove in which is recessed so as to receive the links of the pitch chains F and F'. The bracket C', on the lower mast ring B', is fitted with bearings at $a$ (which may be similar to those for the upper shaft D, or of any other suitable kind,) for the cross-shaft G. At or about the central part of the shaft G, the weighted pulley or drum is fixed, so that the shaft and pulley or drum shall revolve together, a groove being provided in the pulley or drum for the reception of the cord or chain by which the weight H is suspended or attached thereto. At either end of the cross-shaft G a fusee or cone-wheel, I, is fixed, and chains or cords J (which chains I prefer to call the balancing chains) are shown wound thereon, one of their ends being attached to loops or hooks L on each end, bearing parts of the winding roller M. Between the loops or hooks L and the chain pulleys N, toothed pinions O are fixed, one at each end of the axle of the roller M; and movable racks P, the inner ends of which are provided with eyes fitting over the shaft G, gear into the teeth thereof. The sail, which is indicated by the heavy line S in fig. 1, by the shaded surface S in fig. 2, and seen in full front elevation in fig. 3, is attached by its lower end or edge to the roller M, and by its upper to the stretcher R, which is again secured to the pitch chains F and F', as more particularly seen at fig. 1. The outer ends of the upper cross-shaft D, and the winding roller M, are well fitted into bearings in the upper and lower ends respectively of the stretchers T and T'; thus the sail is held suspended between the four sides of a stiff frame. It is preferred to make these stretchers, T and T', of malleable iron, and of tubular construction, as under this form a very high amount of rigidity, compared with the weight of the material employed, is obtained. The stretchers may, however, be formed of T, H, or + section, or in any other way, or of any other form and material that may be found convenient, this being a detail which is left more particularly to be settled by the ship constructor or naval architect. The operation of this first modification is as follows: The direction in which the wind is supposed to be blowing is at right angles to the sails, as indicated by the arrows in figs. 1 and 3. Thus, on referring to the drawings, it will be evident that the sails are held in position by a certain weight, H, and as soon as the pressure of the wind, multiplied into the area of the sail itself, exceeds the force of the weight H, and the natural resistance to movement of the weight and friction of the several pieces of framework and the sail itself, an opposite force is produced greater than H and the other above-mentioned counteracting forces, and in proportion as the force, represented in direction by the arrows, is greater than the counteracting force, in a corresponding ratio is the sail blown out of its original position towards the angle represented by the dotted radius and segment $c\ c$, in fig. 1, and in proportion to the extent of movement of the sail in this angular direction, in a corresponding ratio is the sail S wound up on the roller M, so that the portion of sail exposed to the wind is proportionately reduced as the pressure of the wind itself increases, and on the wind pressure again lowering the force represented by the weight H, and the other resistances above mentioned, becomes greater than the opposing force of the wind distributed over the sail, in which case the sail itself approaches nearer to the mast, and its exposed area is again enlarged to an extent corresponding to the wind pressure necessary to maintain an equal propulsive effect. The action of the apparatus shown in this modification is as follows: As soon as the wind blows the sail from the mast, the balancing ropes or chains J are stretched, and being wound around the fusees I, on either end of the shaft G, they, and along with it the weighted pulley or drum G', are turned round in the direction of the arrows, by which movement the chain or rope, by which the weight H is suspended, is wound on the pulley or drum, and the weight itself lifted. The racks P being stationary, relative with the movement of the sail S, therefore as the sail moves from the mast or towards it respectively, as the intensity of the wind increases or diminishes, the pinions O are caused to revolve, and along with them the sail roller M; therefore in accordance with the direction in which the sail moves it is accordingly wound on or off the roller M. The pitch chains F and F', passing over pulleys of equal diameter on the upper shaft D, and the winding on roller M, the upper edge of the sail, attached to the cross-bar or stretcher R, has continually the same force applied to it, and therefore the sail itself is kept constantly stretched. In lieu of placing the fusees at the ends of the shaft G, one fusee may be placed in the centre of the shaft, and the weight pulley G' may be removed to any convenient part of the shaft; this arrangement, however, would necessitate the sail being split down the centre. The weight H, in this modification, may be either a dead weight, or it may be a vessel or box in which part of the ship's cargo may be placed; thus, by the latter arrangement, no additional weight over and above the cargo itself need be carried. Although in the figure illustrating this first modification, the pulleys E and N and E' and N', are shown of equal diameter, it is obvious that their diameter depends on the length of the sail and the relative diameter of the winding roller M and fusees I.

On sheet 2 of the drawings—

Figure 1:
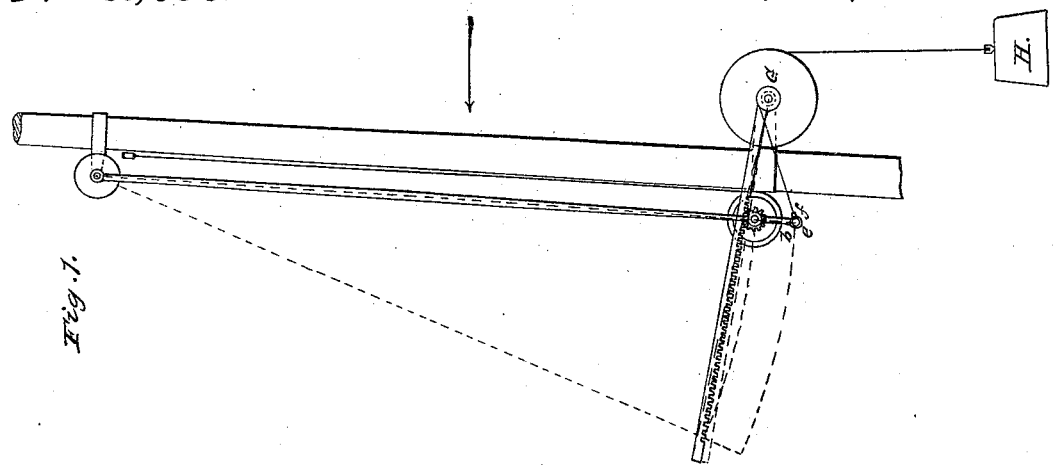
Figure 1 is a side elevation of one modification under which the said invention is carried out in practice.
Figure 2:
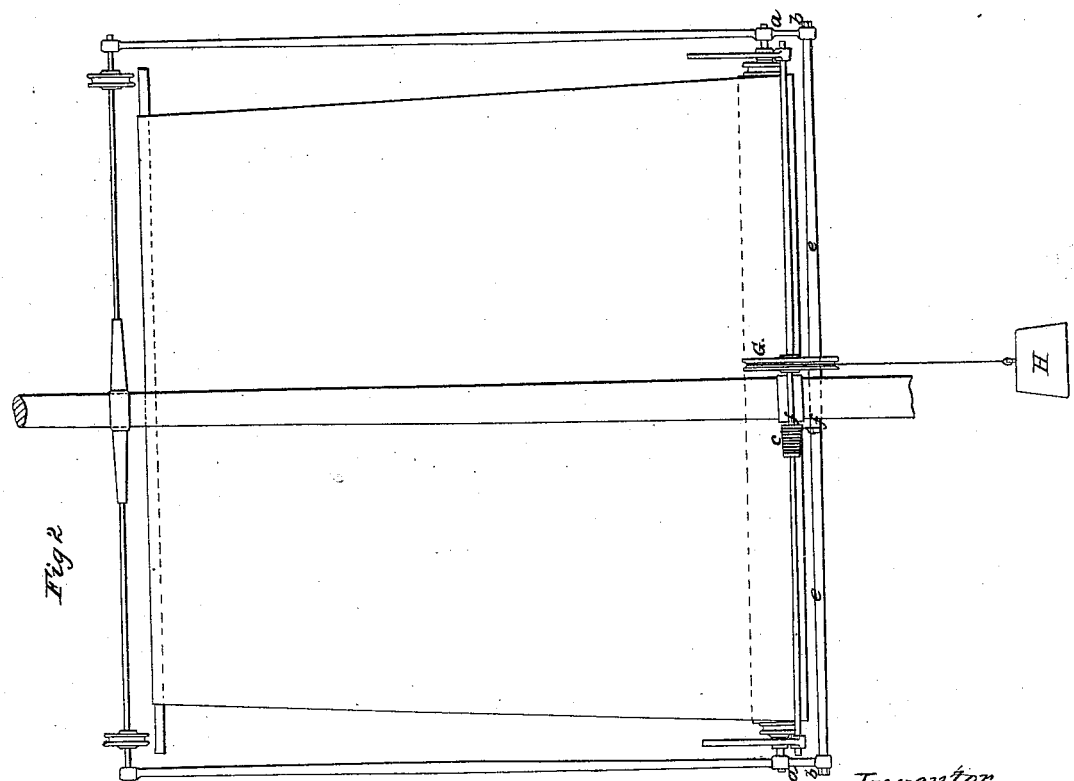

Figure 1 represents a side elevation; and

Figure 2:
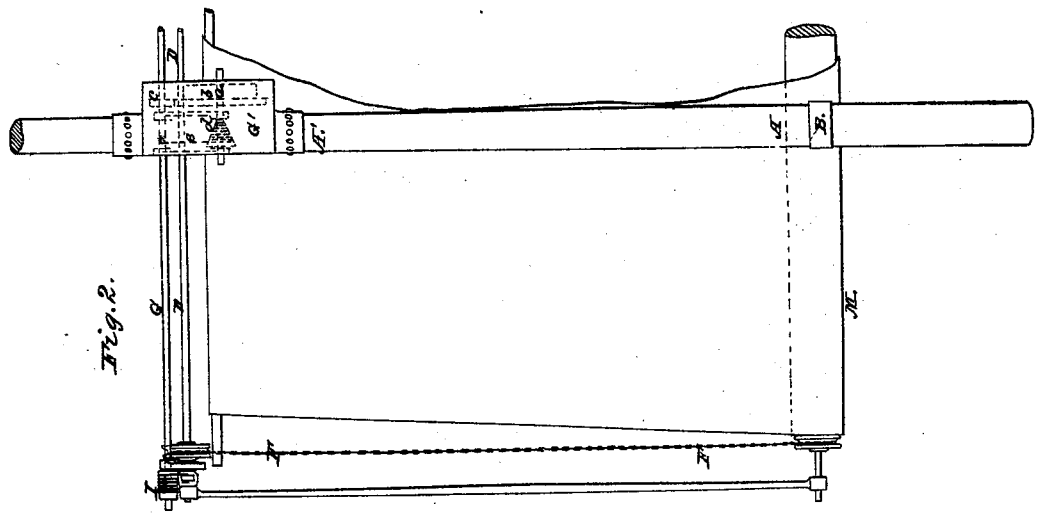
Figure 2 is a front elevation, corresponding to fig. 1.

Figure 2 a front elevation; and

Figure 3 a plan of the second modification of the invention.

In this arrangement, in place of using a weight I employ a coiled spring or springs, like that of a clock or watch, as the main force to counteract the wind pressure. In this modification A is the mast, and to it the lower part of the sail is attached by the ring B, the cross-shaft D being provided with pitch pulleys for the reception of the links of the guiding chains F and F', and the upper edge of the sail itself is secured by the top cross-bar to the chains, and by its lower edge to the winding roller M, as in the preceding arrangement, and need not be herein further referred to, as the same letters of reference are affixed to corresponding parts in this as in the first modification. Distinction must be made between the dead weight employed in the preceding modification and the coiled spring used in this second arrangement, as well as the receding of the top in lieu of the lower edge of the sail, as seen by the dotted angle and segment $c\ c$, and the placing of the counteracting force so as to act upon the upper in lieu of the lower edge, to the specifying of which I now proceed.

To the upper part of the mast an iron box, G', or one made of any other suitable material, is fixed by bolts, rivets, or otherwise. The exterior shape or contour of the box, such as it is preferred to employ, (although I do not confine myself thereto,) is seen at G', at figs. 1 and 2. Across its central part or thereabouts, the shaft a passes, to which the coiled spring contained in the spring box b is secured, the tension of the spring being at first produced by winding it up by means of the pinion e, more particularly seen by the pitch line c, in fig. 1. The shaft a is provided with a fusee wheel, d, to which the rope or chain e, partly wound round the shaft G, is attached; then as the action of the wind on the sail causes the unwinding of the balancing cords J off the fusees I, at the same time the cord e becomes wound off the fusee a upon the spindle or shaft G. In place of using the flat coiled spring directly, as previously described, it may be made sufficiently long to transfer its power from the spindle of the spring-box shaft to another drum upon a parallel shaft, thus multiplying its power. From the spindle the power is conducted to the fusees.

On sheet 3 of the drawings—

Figure 1 represents a side elevation; and

Figure 2 a front elevation of the third modification of my said invention.

In this arrangement, the greater number of parts are similar to those shown and described in reference to the first modification; a dead weight, H, suspended from a pulley, being shown as the force to counteract the wind pressure, although a coiled spring, or other elastic medium, may be used instead. The chief feature in this third modification consists in not using a rack and pinion for producing the rotation of the winding roller M, but in substituting therefor a frame, a, attached in the same manner as the rack in the first modification to the lower cross-shaft. Across this frame a, the cord or chain e, passing also round the pulley b, is attached, so that as the sail recedes from or approaches to the mast, the chain or cord e, being tightly pulled round the drum b, on the axis of the roller M, causes the winding on or off of the sail. In this modification, as in the first, in lieu of placing the fusees at the end of the shaft G, one fusee may be placed at the centre of the shaft.

Figure 3, on sheet 3 of the drawings, represents a side elevation of the fourth modification of the invention. In its principal features this modification corresponds to the first, the chief difference therefrom consisting in the employment of a long lever spring, W, in lieu of a weight, H, as shown at figs. 1 and 2 of the first sheet of drawings, for producing the force to counteract the wind pressure; and in order to get the spring W as short and to occupy as little room as possible, a small pulley, a, is substituted for the large pulley G' in the first modification, so that the angular movement of the spring for winding upon or unwinding a portion of the sail is correspondingly reduced, which arrangement, however, necessitates the introduction of a stronger spring, W, than would be necessary if the pulley a were of larger diameter. These details, however, it is preferred to leave to the judgment of the naval architect.

On sheet 4—

Figure 1 represents a side elevation of the fifth modification of my invention.

In this arrangement, the chief part of the counteracting apparatus is removed from the lower to the upper edge of the sail S; that is to say, in place of the lower edge receding from the mast, as in some of the preceding modifications, in this arrangement it is the upper edge which recedes, as in the second modification, as shown by the dotted radius and segment c c. A stiff spring, d, is employed as the counteracting force, as in the fourth modification, and the frame a and cord e passing round a drum on the shaft D, as in the third modification, are here shown as applied to the counteracting of the wind at the upper edge of the sail. The winding roller M is in this, as in the preceding arrangements, placed at the lower edge of the sail, it being preferred to so situate it, because if placed at the upper edge, for obvious reasons, more counteracting power would be required. The roller M is moved relatively with the wind pressure by means of pitch chains F passing over the guide pulleys on the upper cross-shaft D and the ends of the roller itself.

Figure 2, on sheet 4, is a part side elevation of a sixth modification of my said invention, in which the difference from the fifth consists in using the racks a and pinions b for producing the winding movement of the roller, the winding roller M, not seen in the drawings, being placed at the lower edge for the same reason as in the preceding arrangement. Another peculiarity in this sixth modification consists in the use of a stiff bar, B, hinged to the mast at C, and acted upon by a spring, D, near to its fulcrum, as the means for counteracting the wind pressure on the sail S. The action of this arrangement is at once obvious on inspection of fig. 2, sheet 4, and therefore need not be again referred to.

Figure 3, sheet 4, is a part side elevation of a seventh modification of the invention, which is nearly similar to the first and second modifications hereinbefore described, the only difference consisting in the employment of the stiff bar a and spring b as the means for counteracting the wind pressure.

Figure 4:
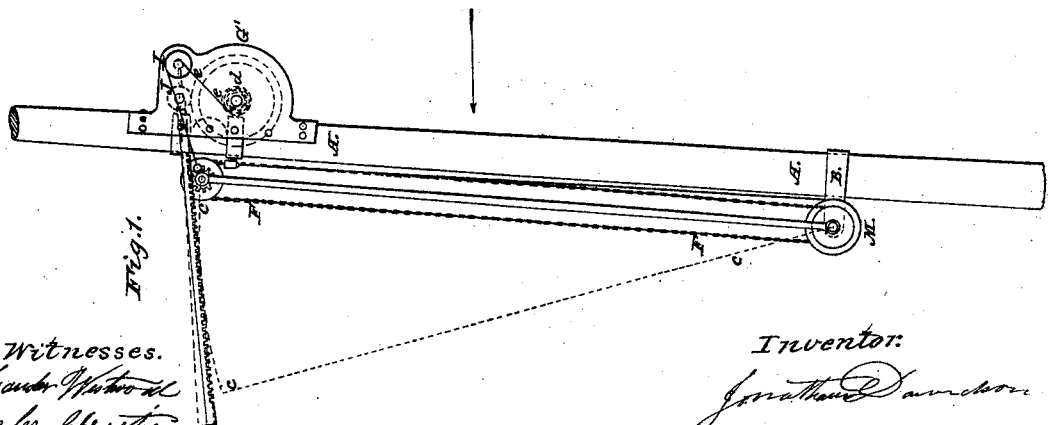

Figure 4, sheet 4, is a part side elevation of the eighth modification of the invention, which is generally similar to fig. 1, on the same sheet of drawings, with the exception that a coiled or helical spring, a, is used as the counteracting force; the action of the apparatus being in all respects similar to the fifth modification, need not be again specified.

Figure 5, sheet 4, is the ninth modification, and this being generally similar to the first and second and seventh modifications, with the exception only that a coiled or helical spring, a, is employed to counteract the wind pressure, need not be herein further described or referred to.

On sheet 5 of the drawings—

Figure 1 represents a side elevation of the tenth modification of the invention, and in which compressed air is used as the medium to counteract the wind pressure. The mode in which this counteracting medium is employed in this arrangement is as follows: To the mast A, an air vessel, B, is secured, to which the cylinder C, containing the piston E, is connected, a passage, F, being provided for the passage of the compressed air to the upper side of the piston E. The action of the air is to keep the piston E at the bottom of the cylinder.

To the piston a rod, G, is secured, which passes through a stuffing-box at H. In its upper or outer end an eye is formed, through which the chain or rod I is fastened, its other end being wound round the small on the shaft G'. Accordingly, then, as the wind acts upon the sail to cause it to recede from the mast A, in a corresponding ratio is the cord or chain I wound up on the fusee on the shaft G', and the piston E correspondingly raised, and on the wind pressure lowering, the elasticity of the air acting on the piston causes the sail to be drawn into its original position.

Figure 2, sheet 5, represents this modification of the invention slightly the preceding arrangement, consisting in attaching the toothed causing it to act upon the pinion L on the shaft applied to any convenient part of it may be situated arms projecting out from the mast, the said apparatus being so combined with the sail that the movement of the roller along its rack or guiding arm shall cause the sail to increase or diminish in size in inverse proportion to the force or pressure of the wind, substantially as herein specified.

In testimony whereof I have signed my name to this specification, and to the drawings accompanying same, in the presence of two subscribing witnesses.

JONATHAN DAVIDSON.

Witnesses:
  ALEXANDER WESTWOOD,
  CHARLES CHRISTIE.